United States Patent [19]

Onishi et al.

[11] 4,172,266
[45] Oct. 23, 1979

[54] MAGNETIC RECORDING-REPRODUCING DEVICE

[75] Inventors: Masanori Onishi, Katano; Hidemi Sasaki, Neyagawa, both of Japan

[73] Assignee: Matsushita Electric Industrial Co., Ltd., Osaka, Japan

[21] Appl. No.: 843,538

[22] Filed: Oct. 19, 1977

[30] Foreign Application Priority Data

Oct. 20, 1976 [JP] Japan .................. 51-126582

[51] Int. Cl.² .................. G11B 15/22; B65H 59/38
[52] U.S. Cl. .................. 360/74.2; 242/187; 360/72.3; 360/137
[58] Field of Search .................. 360/74, 137, 69, 72, 360/96; 242/187, 204

[56] References Cited

U.S. PATENT DOCUMENTS

| | | | |
|---|---|---|---|
| 3,434,725 | 3/1969 | Eibensteiner | 360/74 |
| 3,735,054 | 5/1973 | Poshimura | 360/69 |
| 3,921,215 | 11/1975 | Asami | 360/74 |
| 4,018,404 | 4/1977 | Sami | 360/74 |
| 4,033,491 | 7/1977 | Aldenhoven | 360/69 |

Primary Examiner—Robert S. Tupper
Attorney, Agent, or Firm—Burgess, Ryan and Wayne

[57] ABSTRACT

A magnetic recording-reproducing device operable by selective depression of various operating buttons and a manual switch in various modes. A reproduce button and a rewind button or a fast-forward button may be simultaneously locked in operative positions. A review mode is attained by the depression of the fast-forward button when the reproduce button is kept locked in the operative position. A cue mode is attained by the depression of the fast-forward button when the reproduce button is kept locked in the operative position. When the tape transport motion is halted as the tape is completely rewound or taken up in the review or cue mode, the rewind or fast-forward button is released from the locked position and the recording-reproducing device is switched into the reproduce mode. When no further tape transport is permitted, that is, when the tape is completely taken up in the cue mode, the reproduce button is released from the locked position and the magnetic recording-reproducing device is automatically switched to the stop mode. However, when the tape is completely rewound in the review mode, the recording-reproducing device remains in the reproduce mode and the tape is played back. When a tape counter displays a predetermined number, the locked rewind or fast-forward button may be automatically released and the recording-reproducing device may be automatically switched to the reproduce mode; and when a manual switch is kept open, the tape-transport motor is automatically stopped but the record and reproduce buttons are kept locked when the tape is completely taken up in the record mode.

3 Claims, 28 Drawing Figures (a)

(b)

(a)

(b)

MAGNETIC RECORDING-REPRODUCING DEVICE

BACKGROUND OF THE INVENTION

The present invention relates to generally a magnetic recording-reproducing device, and more particularly an auto-stop mechanism thereof.

Various types of magnetic recording-reproducing devices including various types of auto-stop mechanisms have been invented and demonstrated. These recording-reproducing devices have a common function in that when a tape is completely taken up in the reproduce mode or in the record mode wherein the tape is transported at a constant speed, the recording-reproducing device is automatically stopped. However, auto-stop mechanism capable of accomplishing various functions other than merely stopping the tape when it has been completely taken up or rewound have not been proposed.

SUMMARY OF THE INVENTION

One of the objects of the present invention is therefore to provide a magnetic recording-reproducing device incorporating novel auto-stop mechanisms capable of accomplishing various functions.

A main object of the present invention is to provide a magnetic recording-reproducing device wherein a reproduce button and a rewind button or a fast-forward button may be simultaneously locked in their operative positions. The recording-reproducing device may be locked in a cue mode wherein a tape is fast-forwarded at an accelerated speed while the reproduce button is kept locked or a review mode wherein the tape is rewound at an accelerated speed while the reproduce button is kept locked. When the tape is completely rewound or taken up in the rewiew or cue mode, the rewind button or the fast-forward button is released from its locked operative position to the initial position and the recording-reproducing device is once switched to a reproduce mode. Thereafter when the tape is completely rewound, the magnetic recording-reproducing device remains in the reproduce mode so that the tape is played back. However, when the tape is completely taken up, the reproduce button is released from the locked position so that the magnetic recording-reproducing device is automatically reset. Thus, the manual operations of the magnetic recording-reproducing device may be considerably facilitated.

Another object of the present invention is to provide a magnetic recording-reproducing device wherein a tape counter displays a predetermined number in a rewind mode or in a fast-forward mode, the locked rewind or fast-forward button may be automatically released and the recording-reproducing device may be automatically switched to the reproduce mode.

A further object of the present invention is to provide a magnetic recording-reproducing device including a manual switch so that when this switch is kept opened in the record mode, the tape transport motor may be automatically stopped while the record and reproduce buttons are kept locked in their operative positions when the tape is completely taken up. However, when this switch is kept closed, the motor may be automatically stopped and the record and reproduce buttons may be automatically released from the locked positions.

The above and other objects, features and advantages of the present invention will become more apparent from the following description of preferred embodiments thereof taken in conjunction with the accompanying drawings.

BRIEF DESCRIPTION OF THE DRAWINGS

FIG. 5 shows the locking mechanism in a reproduce mode;

FIG. 6 shows the locking mechanism in a record mode;

FIG. 7 shows the locking mechanism in a stop mode switched from either of said reproduce or record mode;

FIG. 8 shows the locking mechanism in a rewind mode;

FIG. 9 shows the locking mechanism in the stop mode switched from said rewind mode;

FIG. 10 shows the locking mechanism in the reproduce mode after a review or cue operation;

FIG. 11 shows the locking mechanism in a locked cue mode;

FIG. 14 shows the mechanism in the rewind mode;

FIG. 15 shows the mechanism returned to the stop mode from the rewind mode;

FIG. 16 shows the mechanism in the fast-forward mode;

FIG. 17 shows the mechanism returned to the stop mode from the fast-forward mode;

FIGS. 20 and 21 show the counter mechanism in the rewind mode;

FIGS. 22 and 23 show the counter mechanism in the fast-forward mode;

FIGS. 27(*a*) and 28(*a*) being top views while FIGS. 27(*b*) and 28(*b*), are side views.

DESCRIPTION OF THE PREFERRED EMBODIMENTS

Figure 1:
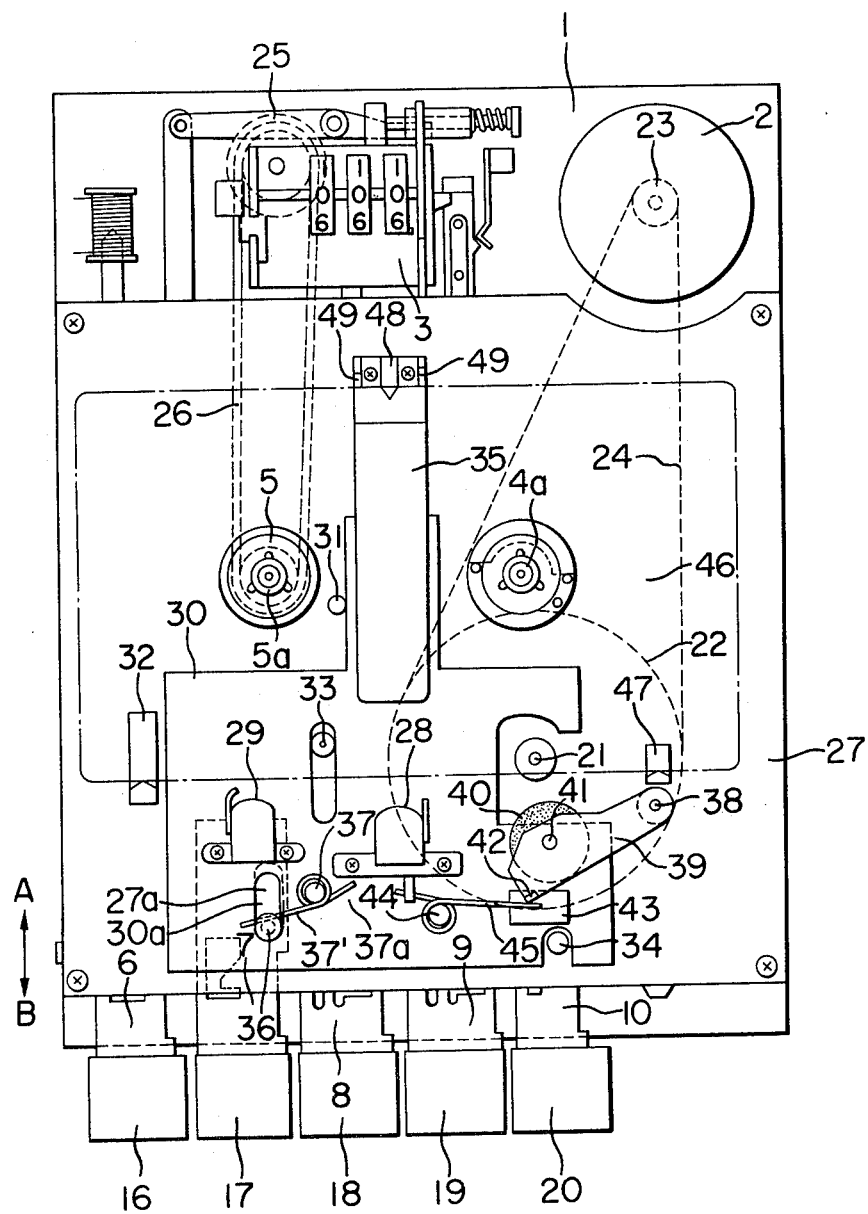
FIG. 1 is a top view of a cassette type magnetic recording-reproducing device in accordance with the present invention.

Referring first to FIG. 1, a tape transport motor 2 and a tape counter 3 are securely mounted on a main chassis 1. A take-up reel turntable and spindle 4 and a supply reel turntable and spindle 5 are rotatably mounted on the main chassis 1. Also mounted on the main chassis 1 are a record rod 7, a rewinding rod 8, a fast-forward rod 9 and a stop rod 10 for slidable movement in the directions indicated by a double-pointed arrow AB. Rods 7, 8, 9 and 10 are normally biased in the direction B under the forces of bias springs 11-15 loaded between them and the main chassis 1. These rods 7-10 carry at their one ends, a record button 16, a reproduce button 17, a rewind button 18, a fast-forward button 19 and a stop button 20, respectively. A capstan wheel 22 which is made integral with a capstan 21 rotatably mounted on the main chassis 1 is drivingly coupled with a belt 24 to a rotary shaft 23 of the motor 2 so that upon rotation of the motor 2, the capstan 21 is driven. A drive pulley 25 of the counter 3 is drivingly coupled with a belt 26 to the supply reel turntable and spindle 5 so that the numerical indication on the tape counter 3 may change in response to the rotation of the supply reel turntable and spindle 5.

An auxiliary chassis 27 is mounted on the main chassis 1 and is spaced apart therefrom by a predetermined distance. Mounted on this auxiliary chassis 27 is a head base 30 upon which are mounted a record-reproduce head 28 and an erase head 29 which is slidably moved in the direction A and B along guide members 31, 32, 33 and 34. The head base 30 is pressed against the auxiliary chassis 27 under the force of a left spring 35 loaded between the head base 30 and the auxiliary chassis 27. The head base 30 is also connected through a connection pin 36 to the reproduce rod 7. That is, one end of the pin 36 is securely attached to the reproduce rod 7 while the other end thereof is extended through an elongated slot 27a formed through the auxiliary chassis 27 and an elongated slot 30a formed through the head base 30 beyond the upper surface thereof. One end of a twisted spring 37' which is freely fitted over a pin 37 extended from the head base 30 is brought into engagement with a pin 37a while the other end of the spring 37' is fitted into a peripheral groove 36a of the connection pin 36 so that the pin 36 may be normally biased in the direction B. Therefore when one pushes the reproduce rod 7, the head base 30 is also caused to move in the same direction through the connection pin 36 and the twisted spring 37'. When the head base which is brought to the reproduce position is imparted with a force in the direction B, the head base 30 is caused to move in the direction B against the spring 37'. A pinch roller arm 39 is pivoted with a pin 38 to the auxiliary chassis 27, and a pinch roller 40 is rotatably carried by a shaft 41 which in turn is carried by the pinch roller arm 39. A projection 42 which is extended from the undersurface of the pinch roller arm 39 is inserted into a square aperture 43 formed through the head base 30. The pinch roller arm 39 is normally biased about the shaft 38 in a clockwise direction under the force of a twisted spring 45 which is freely fitted over a pin 44 extended from the head base 30. One end is securely held and the other end is brought into engagement with the pinch roller arm 39. Therefore when one pushes the reproduce button 17 in the direction A, the head base 30 is moved in the same direction. The square aperture 43 is also thus displaced and the pinch roller 40 is pressed against the capstan 21. When the reproduce button 17 is returned to the inoperative position shown in FIG. 1, the square aperture 43 is returned to its initial position. Consequently the pinch roller 40 is moved away from the capstan 21. The tape which is used in this embodiment has its both ends securely attached to two reel hubs and is encased within a case. That is, a cassette tape 46 is used. The cassette 46 includes a take-up spindle 4a and a supply reel spindle 5a carrying the above reel hubs. The case 46 is positioned with the aid of the guide members 32 and 33 and positioning members 47 and 48 and is biased in the direction B by pressure members 49 attached to the leaf spring 35 at the fixed end thereof.

Figure 2:
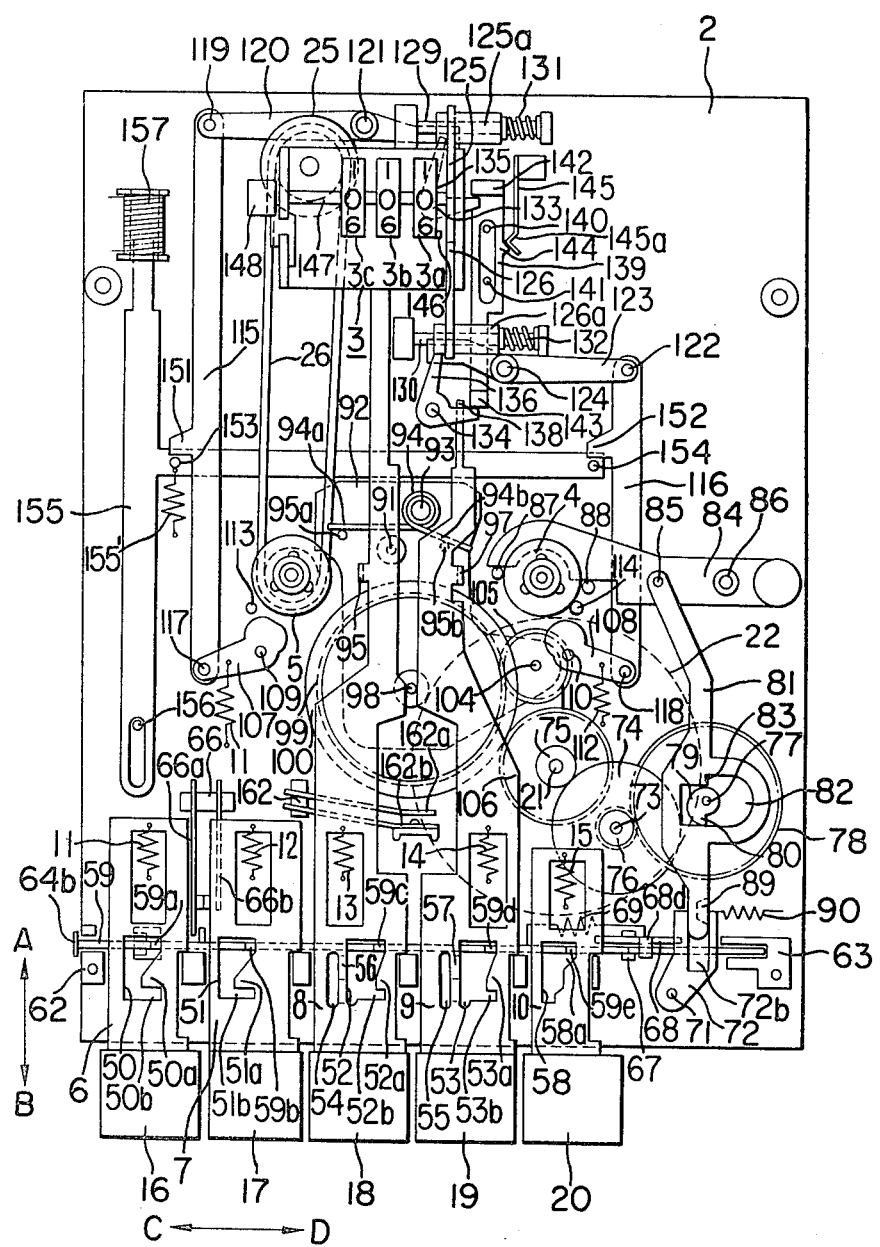
FIG. 2 is a top view thereof with a head base and an auxiliary chassis removed.

So far the mechanism shown in FIG. 1 has been described. When the head base 30 and the auxiliary chassis 27 are removed from FIG. 1, one may see the mechanism as shown in FIG. 2. The arrangement shown in FIG. 2 includes, in general, (a) an operation button mechanism, an automatic lock release mechanism for automatically releasing an operation button which has been locked by the operation button mechanism when the tape has been completely wound up; (b) a memory mechanism for activating the automatic lock release mechanism in the fast-forward or rewinding mode when the counter 3 indicates a predetermined count, (c) an automatic indexing mechanism which cooperates with the automatic lock release mechanism for indexing the tape, and (d) a control mechanism which cooperates with the automatic lock release mechanism so as to stop only the tape drive motor when the tape is completely wound up and to keep an operation button locked. The construction and modes of operation of these mechanisms will each be described in detail.

Figure 3:
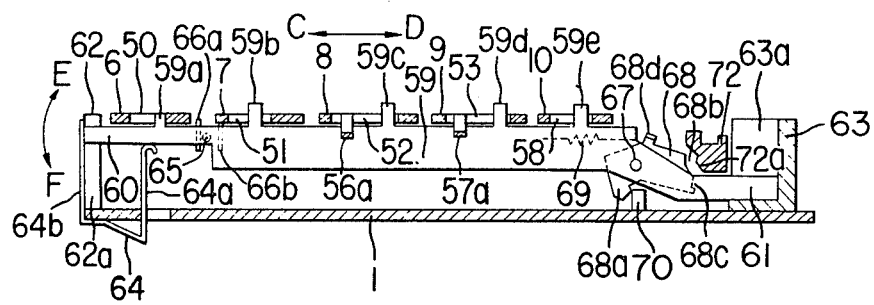
FIGS. 3 and 4 are front views of an operation button locking mechanism.

First the operation button mechanism will be described. The record and reproduce rods 6 and 7 have openings 50 and 51 which define triangular projections 50a and 51a, each having an inclined side and grooves 50b and 51b. In like manner, the rewinding and fast-forward rods 8 and 9 have openings 52 and 53 which in turn define triangular projections 52a and 53a, each having an inclined side and grooves 52b and 53b. The projections 50a and 51a are similar in shape while the projections 52a and 53a are similar in shape. The height of the projections 50a and 51a is greater than that of the projections 52a and 53a. The rewind and fast-forward rods 8 and 9 are further formed with elongated slots 54 and 55 in parallel with the left sides of the openings 52 and 53. The portions 56 and 57 which bridge between the openings 52 and 53 and the elongated slots 54 and 55, protrude downwardly substantially at the midpoints between the ends thereof to form projections 56a and 57a. This is best shown in FIG. 3. The stop rod 10 is formed with an opening 58 which in turn defines a first inclined side 58a and a second inclined side 58b.

Projections 59a-59e which are extended upright from the upper surface of a locking plate 59, are inserted into the openings 50-58 of the rods 7-10. The locking plate 59 is structured so as to lock a pressed operation button by locking the corresponding operation rod. As shown in FIG. 3, left and right ends 60 and 61 of the locking plate 59 are inserted into grooves 62a and 63a, respectively, of supporting members 62 and 63 securely fixed to the main chassis 1 so that the stroke of the locking plate 59 in the directions A and B (See FIG. 2) and the movement in the direction D in FIG. 3 are restricted. The left end 60 of the locking plate 59 is normally biased upward by a pushing leg 64a of a leaf spring 64 attached to the undersurface of the main chassis 1. The locking plate 59 is normally biased in the direction D by a pressing leg 64b of the leaf spring 64. The locking plate 59 is swingable in the directions E and F about a point adjacent to the right end 61 thereof. For instance, when the rewind button 18 is depressed, the rewind rod 8 is displaced in the direction A. Projection 56a which is extended downward from the bridging portion 56 of the rewind rod 8, pushes the locking plate 59 downward against the pushing leg 64a of the leaf spring 64 so that the locking plate 59 is swung. This is also true for the depression of the fast-forward button 19. That is, the projection 57a of the fast-forward rod 9 pushes the locking plate 59 downward.

A switch actuating pin 65 extends laterally of the locking plate 59 at a position adjacent to the left end thereof. The pin 65 engages with a movable contact 66a of a switch 66 (See FIG. 26) mounted on the main chassis 1 for connecting the motor 2 to a power source or disconnecting it therefrom. When the locking plate 59 is brought into abutment with the supporting member 63 as shown in FIG. 2 or 3, the actuating pin 65 is moved away from the movable contact 66a of the switch 66. The movable contact 66a and a fixed contact 66b of the switch 66 are brought into contact with each other under the elastic force of the movable contact 66a. However, when the locking plate 59 is displaced in the direction C, the actuating pin 65 moves the movable contact 66a away from the fixed contact 66b whereby the switch 66 is turned off.

A kick lever 68 is rotatably mounted with a pin 67 to the locking plate 59 at a position adjacent to the right end thereof. It is normally biased in the counterclockwise direction about the pin 67 under the force of an tension spring 69 so that the lower end 68a of the lever 68 engages with a stopper pin 70 extended from the main chassis 1. An arm 72 is rotatably mounted with a pin 71 on the main chassis 1 adjacent to the right end of the kick lever 68. It is formed with a projection 72a for selective engagement with a recess 68b or 68c in the right side of the kick lever 68. When the rewind or fast-forward button 18 or 19 is depressed and locked, the lower end 68a of the kick lever 68 still remains in engagement with the pin 70. The first recess 68b of the kick lever 68 is in opposed relationship with the projection 72a of the arm 72. When the reproduce button 17 and the record button 16 are depressed and locked, the kick lever 68 rotates in the counterclockwise direction under the force of the spring 69 until a projection 68d of the kick lever 68 engages with the locking plate 59. The recess 68c of the lever 68 is brought into the opposed relationship with the projection 72a of the arm 72. When the arm 72 rotates in the counterclockwise direction as shown in FIG. 1, in response to the operation of a tape-end detecting mechanism to be described hereinafter, the projection 72a is brought into engagement with either of the recesses 68b and 68c of the kick lever 68. The locking plate 59 is thus displaced in the direction C and consequently the locked operation button is released. The biasing force of the spring 69 is sufficiently weaker than that of the pressing leg 64b of the leaf spring 64 so that in the stop mode shown in FIG. 3, the locking plate 59 may be prevented from being displaced in the direction C only under the force of the spring 69.

So far the construction of the operation mechanism has been described and next the mode of operation will be described.

Figure 5:
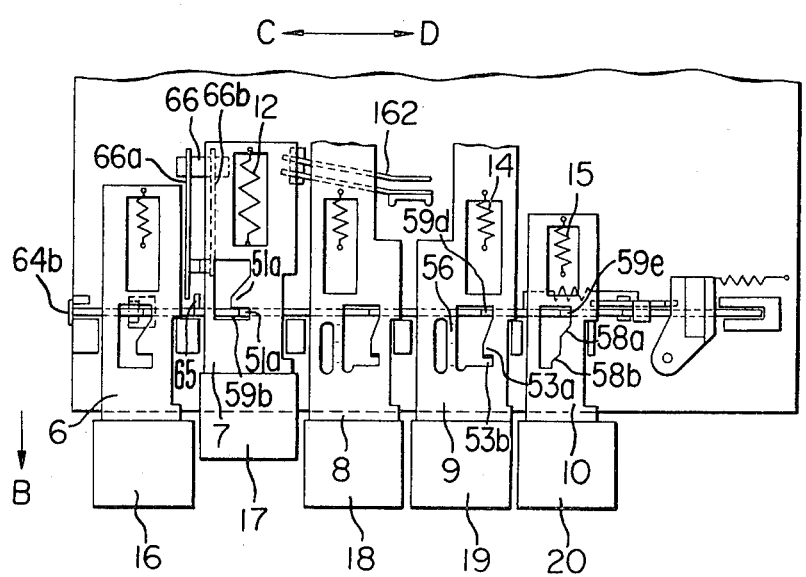
FIGS. 5–11 are top views thereof used for the explanation of the mode of operation thereof.

The reproduce mode is obtained by depression of the reproduce button 17 as shown in FIG. 5. When the reproduce button 17 is depressed from the stop position as shown in FIG. 2, the projection 59b of the locking plate 59 is caused to slide to the inclined side of the projection 51a of the reproduce head so that the locking plate 59 is displaced in the direction C. When the projection 59b of the locking plate 59 moves past the projection 51 of the reproduce rod 7, the projection 59b is brought into engagement with the slot 51b of the reproduce head 7. Thus, the reproduce button 17 is locked in the depressed position so that the magnetic recording-reproducing device is turned into the reproduce mode as shown in FIG. 5.

Figure 7:
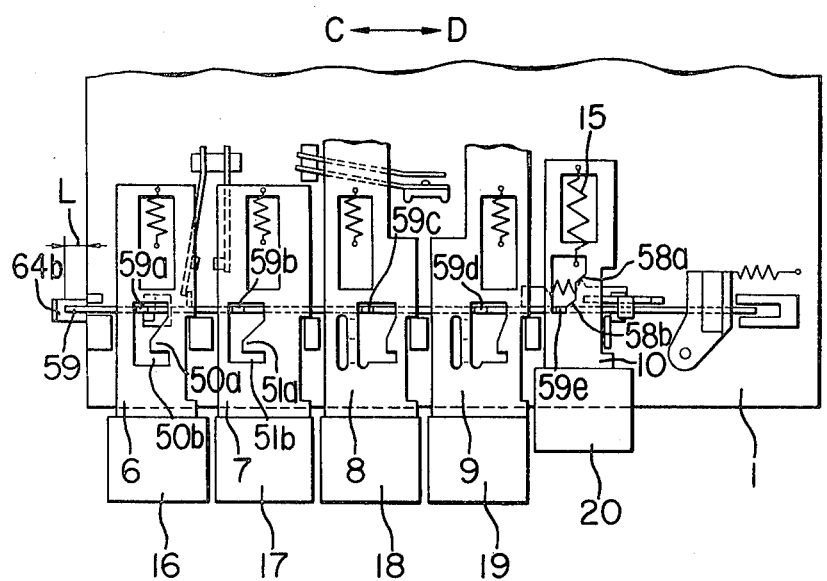

Next, when the stop button 20 is depressed as shown in FIG. 7, the projection 59e of the locking plate 59 is displaced along the first and second inclined sides 58a and 58b of the stop rod 10. Consequently the locking plate 59 is displaced to the direction C by a stroke L. When the projection 59e rides past the second inclined side 58b of the stop rod 10, the projection 59b of the locking plate 59 is released from the groove 51b of the reproduce rod 7. The reproduce rod 7 is then returned to the initial or inoperative position under the force of the spring 12 as shown in FIG. 7. Thus, the recording-reproducing device is turned to the stop mode.

Figure 6:
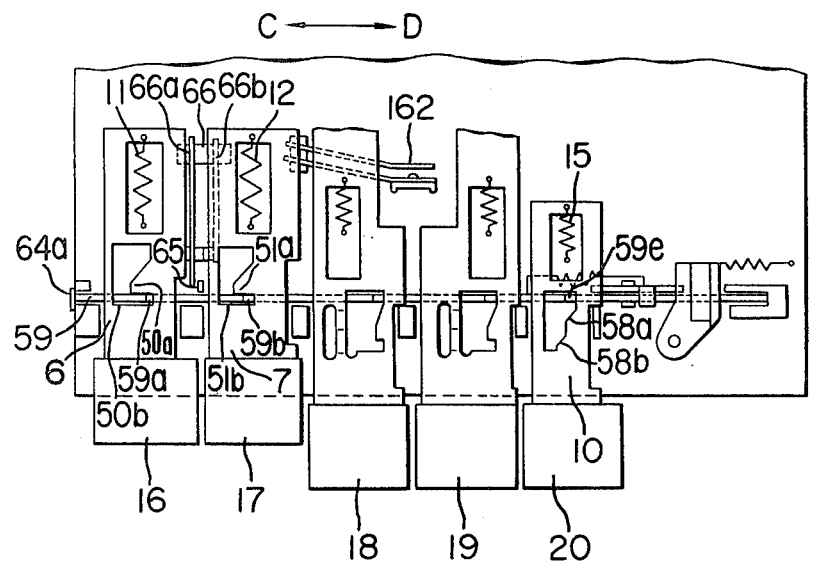

The recording mode is attained by the simultaneous depression of the record button 16 and the reproduce button 17, as shown in FIG. 6. When the record and reproduce buttons 16 and 17 are simultaneously depressed from their initial positions shown in FIG. 2, the projections 59a and 59b of the locking plate 59 are displaced along the inclined sides of the projections 50a and 51b of the record and reproduce rods 6 and 7. The locking plate 59 is then displaced in the direction C as in the case of the reproduce mode, and the projections 59a and 59b are engaged with the grooves 50b and 51b of the record and reproduce rods 6 and 7. Thus, the record and reproduce buttons 16 and 17 are locked in a depressed position and the recording-reproducing device is turned into the record mode as shown in FIG. 7. When the stop button is depressed, the locking plate 59 is displaced in the direction C by a stroke A so that the record and reproduce rods 6 and 7 are released from the locked position and the recording-reproducing device is turned into the stop mode.

Figure 8:
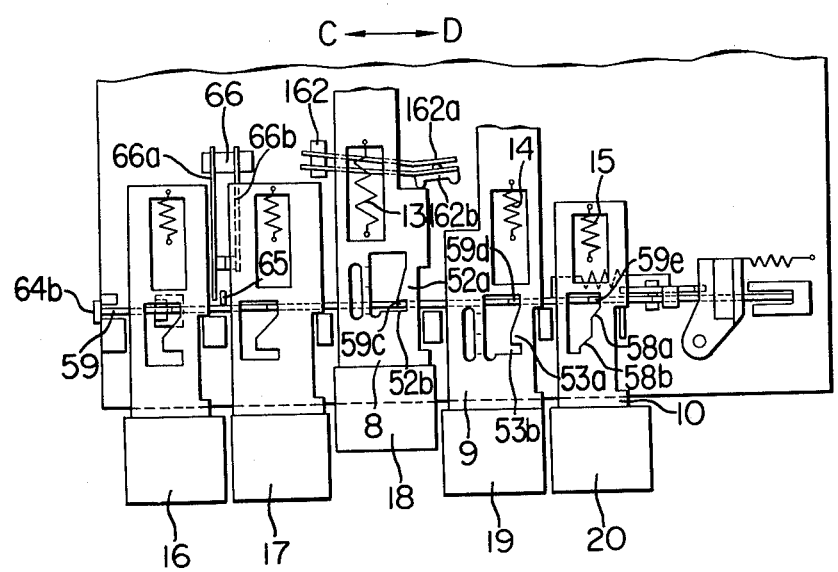

Next, the rewind mode which is attained by the depression of the rewind button 18 as shown in FIG. 8 will be described. When the rewind button 18 is depressed from the inoperative position shown in FIG. 2, the projection 59c of the locking plate 59 is displaced along the inclined side of the projection 52a of the rewind rod 8 so that the locking plate 59 is displaced to the direction C. When the projection 59c of the locking plate 59 passes over the projection or ridge 52a of the rewind rod 8, the projection 59c engages with the slot 52b of the rewind rod 5. Thus, the rewind button 18 is locked in the depressed position and the magnetic recording-reproducing device is set to the rewind mode as shown in FIG. 8.

The fast-forward mode is attained by the depression of the fast-forward button 19. That is, when the fast-forward button 19 is depressed from the stop mode shown in FIG. 2, it is locked in a manner substantially similar to that described above in conjunction with the depression and locking of the rewind button 18. This is because the projection 53a and groove 53b of the fast-forward rod 9 are substantially similar in shape to the projection 52a and groove 52b of the rewind rod 8. That is, when the projection 59d of the locking plate 59 is engaged with the groove 53b of the fast-forward rod 9, the fast-forward button 19 is locked in the depressed position and the recording-reproducing device is set to the fast-forward mode.

Figure 9:
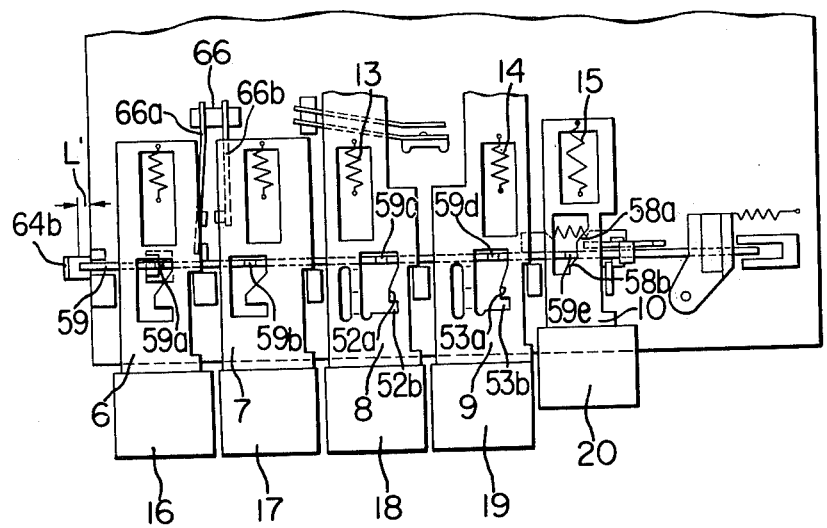

When the stop button 20 is depressed as shown in FIG. 9 in the rewind or fast-forward mode wherein the tape is rewound or forwarded at a high speed, the projection 58b of the locking plate 59 is displaced along the first inclined side 58a of the stop rod 10. When the projection 59b passes over the first inclined side 58a, the projections 59c of the locking plate 59 are released from the grooves 52b and 53b of the rewind and fast-forward rods 7 and 8 so that the rewind or fast-forward button 18 or 19 is released from the locked position.

It is apparent from the comparison between FIGS. 7 and 9 that the mode of returning the reproduce or record mode to the stop mode is different from the mode of returning the rewind or fast-forward mode to the stop mode. That is, when the reproduce or record mode shown in FIG. 5 or 6 is switched to the stop mode, the projection 59e of the locking plate 59 must ride past the first and second inclined sides 58a and 58b of the stop rod 10. However, the rewind mode shown in FIG. 8 is returned to the stop mode when the projection 59e of the locking plate 59 rides past only the first inclined side 58a of the stop rod 10.

Figure 10:
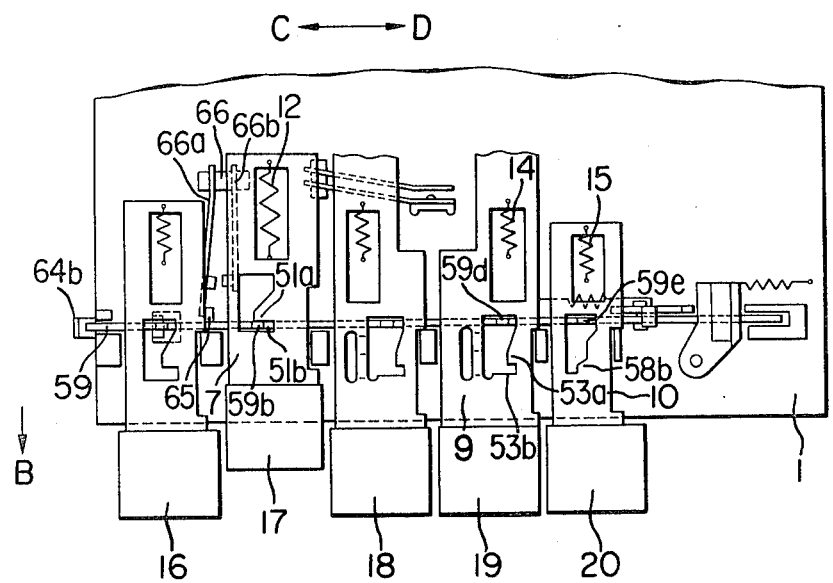

So far, the changeover steps from the stop mode to the reproduce or record mode, from reproduce or record mode to the stop mode, from the stop mode to the rewind or fast-forward mode and from the rewind or fast-forward mode to the stop mode have been described. Next, the cue and review operations will be described. The terms "cue and review operations" refer to the operations for accelerating the transport of the tape in either direction while the recording-reproducing device is kept in the reproduce mode where the tape is kept in contact with the magnetic reproduce-record head. Since the tape may be accelerated in either direction while the user may listen to the reproduced sound, the cue and review operations find a variety of applications. One them is "indexing," that is, the operation for locating the head of a desired song or the like recorded on the tape. The cue and review operations will be described with reference to FIG. 5 showing the reproduce mode. When the fast-forward button 19 is depressed for cueing operation in FIG. 5, the projection 59d of the locking plate 59 is displaced along the inclined side of the projection 53a of the fast-forward rod 9 so that the locking plate 59 is displaced to the direction C. The height of the projection 51a of the reproduce rod 7 is about two times as great as the height of the projection 53a of the fast-forward rod 9. Consequently, even after the projection 59b of the locking plate 59 has passed past the projection 53a of the fast-forward rod 9, the projection 59b of the locking plate 59 is still in engagement with the slot 51b of the reproduce rod 7 so that the reproduce button 17 may remain locked. The reproduce rod 17 is biased in the direction B under the force of the spring 12 so that the projection 59b of the locking plate 59 is pulled halfway from the groove 51 of the reproduce rod 59, but still remains in engagement therewith as shown in FIG. 10. As a result, the projection 59d of the locking plate 59 is prevented from engaging with the groove 53b of the fast-forward rod 9 so that the fast-forward button 19 is not locked. Thus, the user must keep depressing the fast-forward button 19 in order to maintain the cue mode. Immediately after the user releases the fast-forward button 19, the latter returns to the inoperative position under the force of the spring 14 and the recording-reproducing device is immediately returned to the reproduce mode again.

The review operation will be described also with reference to FIG. 5. When the user depresses the rewind button 18, the latter is now locked in a manner substantially similar to that described above in conjunction with the cueing operation. When the user releases the rewind button 18, the recording-reproducing device immediately returns to the reproduce mode.

Figure 4:
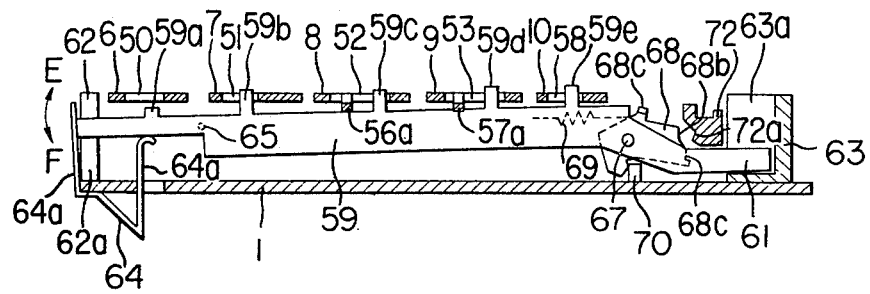

As described above with reference to FIG. 4, when the fast-forward or rewind button 19 or 18 is depressed for the cueing or review operation, the projection 57a or 56a of the rod 9 or 8 pushes the locking plate 59 in the direction F so that the projection 59b of the locking plate 59 which locks the reproduce rod 7 is caused to displace itself downward. The projection 59b has a height which is greater than the downward stroke of the locking plate by the projection 57a or 56a of the fast-forward or rewind rod 9 or 8 so that the reproduce rod 7 may remain in the locked position. As best shown in FIG. 4, the height of the projection 59a which locks the record rod 6 is so selected that the projection 59a is released from the record rod 6 when the locking place 59 is displaced downward. Therefore, when the cue or review operation is effected in the record mode shown in FIG. 6, only the record button 16 is released while the reproduce button 17 remains locked in the reproduce mode. Thus, even when the cue or review operation is started during the record mode, no erratic recording will occur.

Figure 11:
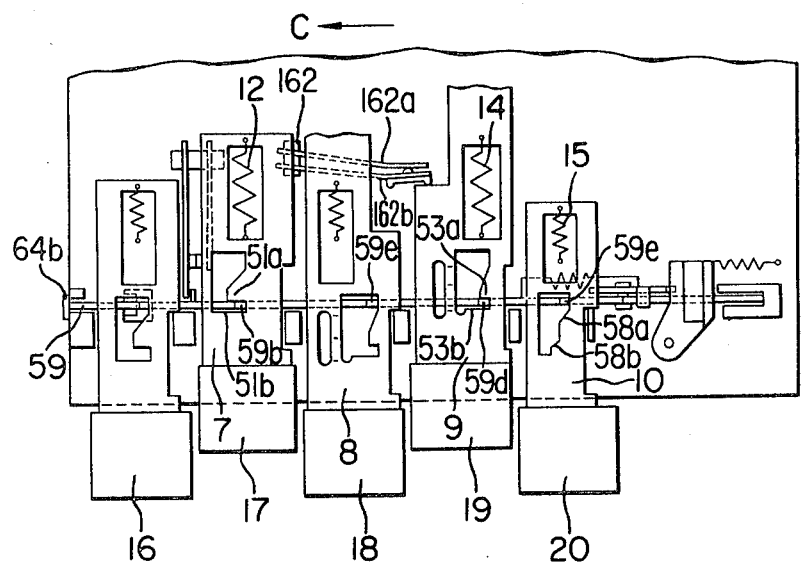

When the fast-forward button 19 or the rewind button 18 is depressed for the cue or review operation in the reproduce mode where the reproduce button 17 is depressed and locked as shown in FIG. 5, the fast-forward or rewind button 19 or 18 is not locked, as described above. As a result, the user must inconveniently keep depressing the fast-forward or rewind button 19 or 18 for a long cue or review operation. However, according to the present invention, the reproduce button 17 may be locked simultaneously with the fast-forward or rewind button 19 or 18 as will be described below. When the user depresses both the fast-forward button 19 and the reproduce button 17 for the cue operation in the reproduce mode shown in FIG. 5, the projection 59b of the locking plate 59 is not retained in position under the force of the spring 12 which biases the reproduce rod 7 in the direction B. As a result, the locking plate 59 is permitted to move in the direction D under the force of the pressing leg 64b of the leaf spring 64 so that the projection 59d of the locking plate 59 rides past the projection 53a of the fast-forward rod 9 and engages with the groove 53b thereof. Thus, both the reproduce and fast-forward buttons 17 and 19 are locked by the locking plate 59 so that the cue operation may be locked as shown in FIG. 11. In like manner, the reproduce and rewind buttons 17 and 18 may be simultaneously locked so that the review operation may be locked.

Next, the mode of operation when the stop button 20 is depressed when the reproduce button 17 and the fast-forward or rewind button 19 or 18 are simultaneously locked for locking the cue or review operation will be described. The difference in stops for returning the recording-reproducing device to the stop mode has been described with reference to FIGS. 5 and 7. When the stop button 20 is depressed when the cue or review operation is locked, the fast-forward or rewind button 19 or 18 is released from the locked position and returned to the initial position; however, the recording-reproducing device remains in the reproduce mode. When the user depresses the stop button 20 again, the reproduce button 17 is released from the locked position and returned to the initial position as will be described in detail hereinafter with reference to FIG. 11. That is, when the user depresses the stop button 20 in the mode shown in FIG. 11, the projection 59e of the locking plate 59 is first displaced along the first inclined side 58a of the stop rod 10 so that the locking plate 59 is displaced in the direction C. When the projection 59e passes over the first inclined side 58a, the projection 59d of the locking plate 59 is released from the groove 53b of the fast-forward rod 9 so that the fast-forward button 19 is released from the locked position and returned to the initial position. Since the reproduce button 17 is still locked, the recording-reproducing device remains in the reproduce mode. When the user depresses the stop button 20 again, the projection 59e of the locking plate 59 is displaced along the second inclined side 58b of the stop rod 10 so that the locking plate 59 is further displaced in the direction C. When the projection 59e goes past the second inclined side 58b, the projection 59b of the locking plate 59 is released from the groove 51b of the reproduce rod 7 so that the reproduce button 17 is released from the locked position and is returned to the initial position. Thus, the recording-reproducing device is returned to the stop or inoperative mode. As described above, depending upon the depression stroke of the stop button 20, the fast-forward button alone or both the fast-forward and reproduce buttons 19 and 17 may be relased. In other words, whether the locked cue operation is released and then the reproduce mode is kept or both the locked cue operation and the reproduce mode are released, is dependent upon how much the user depresses the stop button 20.

The above described operations of the operation button mechanism may be summarized as follows:

(1) The user may depress the reproduce button 17 alone or both the reproduce and record buttons 17 and 16 so that the recording-reproducing device may be set to the reproduce or record mode.

(2) The user may depress and lock only the rewind button 18 or the fast-forward button 19 so that the recording-reproducing device may be switched to the rewind or fast-forward mode.

(3) When the user depresses the stop button 20 in the reproduce, record, rewind or fast-forward mode, the recording-reproducing device is reset or returned to the stop mode.

(4) When, in the reproduce mode, the user depresses the fast-forward or rewind button 19 or 18 and keeps it depressed, the cue or review operation may be attained.

(5) When the user depresses the fast-forward or rewind button 19 or 18 in the record mode when both the reproduce and record buttons 17 and 16 are depressed and locked, only the record button 16 is released so that the record mode may be switched over to the reproduce mode and the user may effect the cue or review operation.

(6) When the user depresses simultaneously both the reproduce button 17 and the fast-forward button 19 or the rewind button 18, the cue or review operation may be locked.

(7) When the user depresses the stop button in the locked cue or review mode, the locked cue or review mode may be switched over the reproduce mode or directly to the stop mode depending upon the stroke of the stop button. Thus, the magnetic recording-reproducing device in accordance with the present invention may be operated in one of the various modes described above.

Next, referring back to FIG. 2, the automatic lock release mechanism will be described which, when the tape is completely wound up, automatically displaces the locking plate 59 so as to release a locked operation button or buttons. A pulley 74 which is rotatably mounted with a shaft 73 to the main chassis 1 adjacent the capstan 21 is pressed against a pulley 75 carried on the same shaft of the capstan 21 so that the pulleys 74 and 75 are rotated in unison with the capstan 21. A gear 76 which is carried by the shaft 73 of the pulley 74 coaxially thereof is in mesh with a cam gear 78 rotatably mounted with a shaft 77 on the main chassis 1. As a consequence, as the capstan 21 is rotated, the cam gear 78 is also rotated. An eccentric cam 79 mounted integrally with the cam gear 78 has a pawl 80 extended radially outwardly from the periphery of the cam 79. The cam 79 is located within an aperture 82 in a lever 81 which has a pawl 83 for engagement with the pawl 80 of the eccentric cam 79 only when the cam gear 78 is rotated in the counterclockwise direction. One end of the lever 81 is pivoted with a pin 85 to the midpoint between ends of a tape end detecting lever 84. One end of the tape end detecting lever 84 is pivoted with a pin 86 to the main chassis 1 while the other end thereof engages with friction pins 87 and 88. These pins are in contact with the periphery of the supply reel turntable and spindle 4 and angularly spaced apart from each other by about 180°. The friction pins 87 and 88 are brought into contact with the supply reel turntable 4 under weak frictional forces so that the rotation of the reel turntable 4 is transmitted to the tape end detecting lever 84 and causes the latter to rotate in the clockwise direction. However, the friction pins 87 and 88 are so constructed and arranged that they will not adversely affect the rotation of the supply reel turntable 4 for winding thereon the tape. The free end of the lever 81 is in engagement with a slot 72b of the arm 72 rotatable about the axis 71 as described above in conjunction with the operation button mechanism. The lever 81 includes a recess 89 formed in the right side face thereof adjacent to the free end thereof so that when the lever 81 is rotated about the pin 85, the arm 72 engages with the recess 89 and is rotated in the counterclockwise direction. The arm 72 is biased in the clockwise direction under the force of tension spring 90 and is normally so positioned that the groove 72b of the arm 72 is in line with the free end of the lever 71 as shown in FIG. 2.

Next, the mode of operation of the automatic lock release mechanism with the above construction will be described. Prior to the fundamental operations of this mechanism, the parts associated therewith will be first described. In any of the record, reproduce, fast-forward and rewind modes, the capstan 21 is rotated in the counterclockwise direction. In the record, reproduce or fast-forward mode, the rotation of the capstan 21 is transmitted to the take-up reel turntable and spindle 4 through a suitable motion transmission mechanism such as an idler (not shown) so that the turntable 4 is rotated in the counterclockwise direction to wind the tape unreeled from the supply reel turntable 6. However, in the rewind mode, the supply reel turntable 5 winds the tape so that the take-up turntable 4 is rotated in the clockwise direction. As described above, the capstan 21 is rotated always in the counterclockwise direction when the tape is transported so that the cam gear 78 is always rotated in the counterclockwise direction. Regardless of the direction of the rotation of the take-up reel turntable 4, either of the friction pins 87 and 88 pushes the tape end detecting lever 84 so as to rotate the lever 84 about the pin 86 in the clockwise direction. As a result, the cam 79 of the cam gear 79 is brought into engagement with one end of the aperture 82 in the lever 81. The pawls 80 of the cam 79a and the pawl 83 of the lever 81 are so dimensioned that even when the lever 81 is displaced up and down in response to the rotation of the cam 79, the pawls 80 and 81 will not engage with each other.

Figure 12:
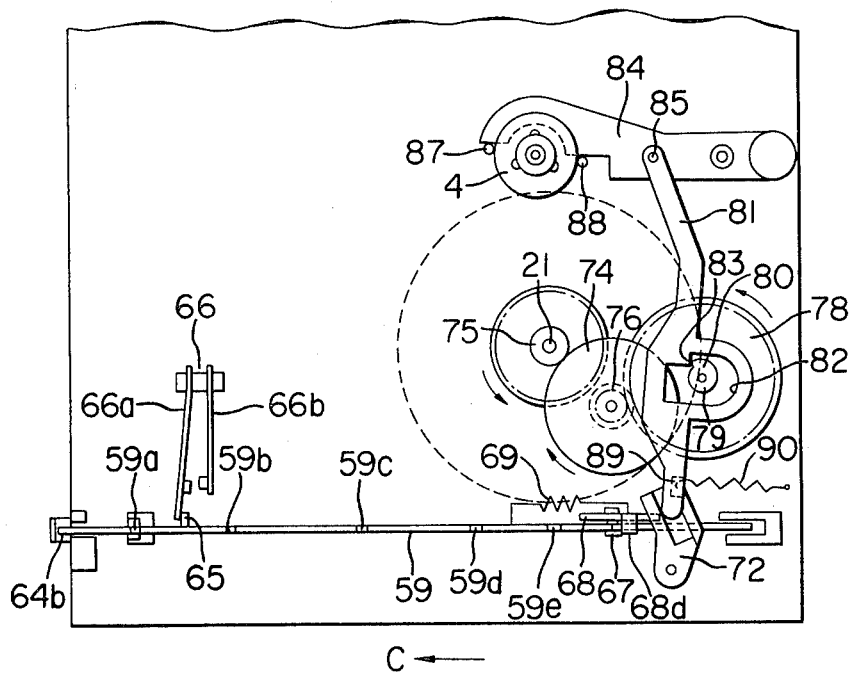
FIG. 12 is a top view of an automatic lock release mechanism.

As described above, the present invention employs a cassette tape the ends of which are securely attached to the reel hubs. When the tape on the supply reel on the supply reel turntable 5 is completely taken up by the take-up reel on the take-up reel turntable 4, the latter is stopped so that the oscillation of the tape end detecting lever 84 ceases. Since the cam gear 78 is still rotating, the cam 79 causes the lever 81 to move in the direction B so that the pawl 83 of the lever 81 engages with the pawl 80 of the cam 79 and consequently the lever 71 is displaced in the direction C (See FIG. 12). As a result, the lever 81 is caused to swing about the pin 85 in the clockwise direction so that the arm 72 is caused to rotate about the shaft 71 through a predetermined angle in a counterclockwise direction against the spring 90. Consequently the locking plate 59 is forced to move in the direction C. Thus, the locked operation button or buttons may be automatically released.

As described elsewhere with reference to FIGS. 7 and 9 in conjunction with the operation button mechanism, the operation buttons to be released may be selected depending upon the stroke in the direction C of the locking plate 59. That is, the stroke or displacement in the direction C of the locking plate 59 is dependent upon the angle of rotation of the arm 72 when the tape is completely taken up by the take-up reel, and is controlled by the angular position of the kick lever 68 rotatably mounted on the locking plate 59. When the user depresses the operation button and locks it, the locking plate 59 is returned to the initial position. Thus, as shown in FIG. 3, the first recess 68b of the kick lever 68 is in opposed relationship with the projection 72a of the arm 72. Therefore, when the tape has been completely taken-up so that the arm 72 is caused to rotate in the counterclockwise direction, the projection 72a engages with the recess 69b of the kick lever 68 so that the locking plate 59 is displaced in the direction C. The stroke of the locking plate 59 is equal to the stroke L' when the user depresses the stop button (See FIG. 9) halfway. As a result, when the fast-forward or rewind button 19 or 18 has been locked, it is immediately released and returned to the initial position. When the reproduce and record buttons 17 and 16 have been locked, the projection 59b of the locking plate 59 has not been completely released from the groove 51b of the reproduce rod 7 so that the reproduce button 17 remains locked. Under these conditions, the locking plate 59 is spaced apart from the initial or inoperative position by the stroke L' in the direction C. Thus, one end 68a of the kick lever 68 is moved away from the pin 70 on the main chassis 1 under the force of the spring 69 and the bent portion 68d of the kick lever 68 engages with the locking plate 59. As a result, the second recess 68c of the kick lever 68 is in opposed relationship with the projection 72a of the arm 72. When the tape is still stopped, the rotation of the cam gear 78 causes the pawl 80 of the cam 79 to engage with the pawl 83 of the lever 81 again so that the lever 81 is displaced. Consequently the arm 72 is caused to rotate in the counterclockwise direction. As a result, the projection 72a of the arm 72 engages with the second recess 68c of the kick lever 68 so that the locking plate 59 is displaced in the direction C. The reproduce button 17 and the record button 16 are released in response to the second shift or stroke of the locking plate 59.

The operations of the automatic lock release mechanism may be summarized as follows:

(1) When the tape is completely taken up in the rewind of fast-forward mode, the rewind or fast-forward button 18 or 19 is automatically released from the locked position by one rotation of the arm 72 and returned to the initial or inoperative position.

(2) When the tape is completely taken up in the reproduce or record mode, the reproduce button 17 or the reproduce button 17 and the record button 16 are automatically released from the locked positions by two rotations of the arm 72 and returned to their initial or inoperative positions.

(3) When the tape is completely taken up in the locked cue operation, the fast-forward button 19 is automatically released by one or the first rotation of the arm 72 so that the recording-reproducing device may be automatically switched to the reproduce mode. In the reproduce mode, the tape is transported in the same direction as in the cue operation and the tape has been completely taken-up so that the arm 72 is further rotated. Consequently the reproduce button 17 is released and the recording-reproducing device is automatically set to the stop mode.

(4) When the tape is completely rewound in the locked review operation, the rewind button 18 is automatically released in response to the first rotation of the arm and the review operation is automatically changed over to the reproduce mode. Since the direction of the tape transport in the reproduce mode is opposite to the direction of the tape transport in the rewind mode, the arm 72 is not permitted to further rotate so that the tape is kept transported in the reproduce mode. Only when the tape has been take-up completely, the arm 72 is rotated in a manner substantially similar to that described above so that the reproduce button 17 is released and the recording-reproducing device is automatically switched to the stop mode.

In addition to the above operations of the automatic lock release mechanism, this mechanism also operates in the rewind or fast-forward mode when the tape counter 3 counts a predetermined length of rewound or fast-forwarded tape.

Prior to the description of a memory mechanism for effecting the above operation, a motion transmission mechanism which is very closely associated with the memory mechanism in the rewind or fast-forward mode will be described. Referring back to FIG. 2 again, a switching or changeover plate 92 is pivoted with a pin 91 to the main chassis 1 substantially at the center thereof. A twisted spring 94 which is loosely fitted over a pin 93 extended from the switching plate 92 adjacent to the pin 91 thereof has its one or left arm 94a and the other or right arm 94b engaged with pins 95a and 95b, respectively, extended from the switching plate 92. The rewind rod 8 and the fast-forward rod 9 have projections 96 and 97, respectively, for engagement with the left and right arms 94a and 94b, respectively, of the spring 94. When the rewind rod 8 is displaced in the direction A, the projection 96 engages with the left arm 94a of the spring 94 and moves it away from the pin 95a. In this case, the switching plate 92 is swung about its pivot pin 91 in the clockwise direction under the elastic returning force of the spring 94. When the fast-forward rod 9 is displaced in the direction A, the projection 97 thereof engages with the right arm 94b of the spring 94 to move it away from the pin 95b. The switching plate 92 is then rotated in the counterclockwise direction about its pin 91 under the force of the spring 94.

Figure 13:
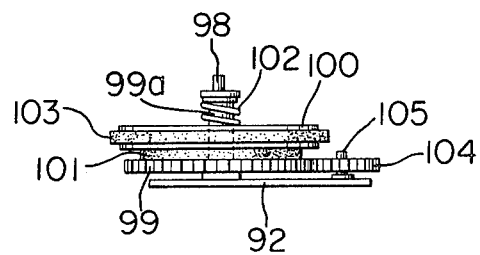
FIG. 13 is a side view of a mechanism for selecting the power transmission for rewinding or the power transmission for fast-forward.

A gear 99 is rotatably mounted with a shaft 98 on the switching plate 92 at the other end thereof. A pulley 100 with a rotary shaft 99a is rotatably carried on the shaft 98 of the gear 99 as best shown in FIG. 13, and a friction disk 101 made of felt or the like is interposed between the gear 99 and the pulley 100. A compression spring 102 is loaded on the shaft 99a so that the pulley 100 is normally pressed against the upper side face of the gear 99 through the friction disk 101. Therefore, unless the pulley 100 is held stationary by an external force, it is rotated in unison with the gear 99. A rubber ring 103 is fitted over the periphery of the pulley 100. The gear 99 is in mesh with a pinion 104 which is rotatably mounted with a shaft 105 on the switching plate 92. Referring back to FIG. 2 again, a capstan gear 106 is carried on the same shaft of the capstan 21. Eccentric arms 107 and 108 are pivoted with pins 109 and 110 on the main chassis 1 adjacent to the pulley 100 and spaced apart from each other diametrically of the pulley 100. Tension springs 111 and 112 are loaded between the main chassis 1 and the eccentric arms 107 and 108 so that the eccentric arm 107 is biased in the counterclockwise direction while the eccentric arm 108, in the clockwise direction. Stopper pins 113 and 114 are extended from the main chassis 1 adjacent to the eccentric arms 107 and 108 so as to limit the rotation in the clockwise direction of the eccentric arm 107 and the rotation in the counterclockwise direction of the eccentric arm 108. One end of connecting rods 115 and 116 is pivoted with pins 117 and 118, respectively, to the eccentric arms 107 and 108, respectively.

Figure 14:
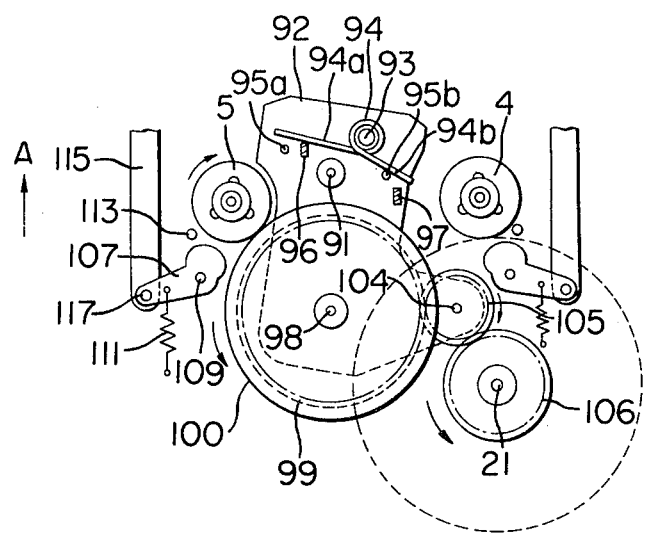
FIGS. 14–17 are top views of the mechanism shown in FIG. 13 used for the explanation of the mode of operation thereof.
Figure 15:
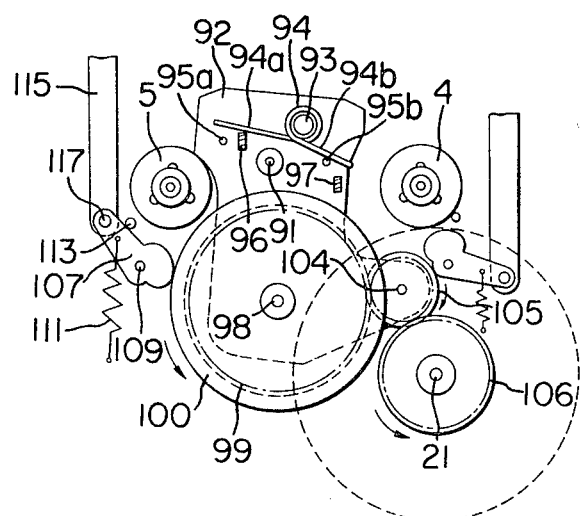

The motion transmission mechanism so far described above is a mechanism for driving and stopping the reel turntable. Next, the mode of operation of this mechanism with the above construction will be described. When the user depresses the rewind button 18, the projection 96 of the rewind rod 8 engages with the left arm 94a of the spring 94 mounted on the switching plate 92 and moves it away from the pin 95a as shown in FIG. 14. As a result, the switching plate 92 is rotates about the pin 91 in the clockwise direction. Consequently, the pulley 100 mounted thereon is pressed against the reel turntable 5 and the pinion in mesh with the gear 99 which is rotatable in unison with the pulley 100 is brought into mesh with the capstan gear 106. Therefore, the rotation in the counterclockwise direction of the capstan 21 is transmitted to the reel turntable and spindle 5 through the capstan gear 106, the pinion 105, the gear 99 and the pulley 100 so that the reel turntable 5 is rotated in the clockwise direction to rewind the tape. When the connecting rod 115 is displaced in the direction A in the rewind mode, the eccentric arm 107 is caused to rotate against the spring 111 and is pressed against the pulley 100 as shown in FIG. 15. As the pulley 100 is rotated in the counterclockwise direction, the eccentric arm 107 firmly engages with the pulley 100 so that the pulley 100 is moved away from the turntable 5. Since the motion of the capstan is not transmitted to the reel turntable and spindle 5, the latter is stopped so that the transport of the tape is also suspended. In response to the stopping of the tape transport, the automatic lock release mechanism described elsewhere is activated.

Figure 16:
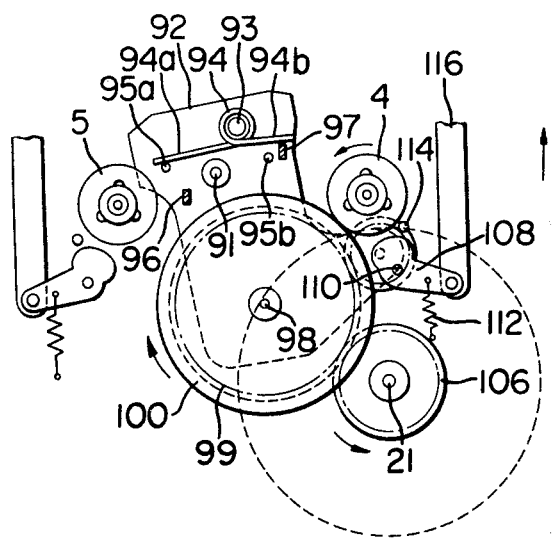
Figure 17:
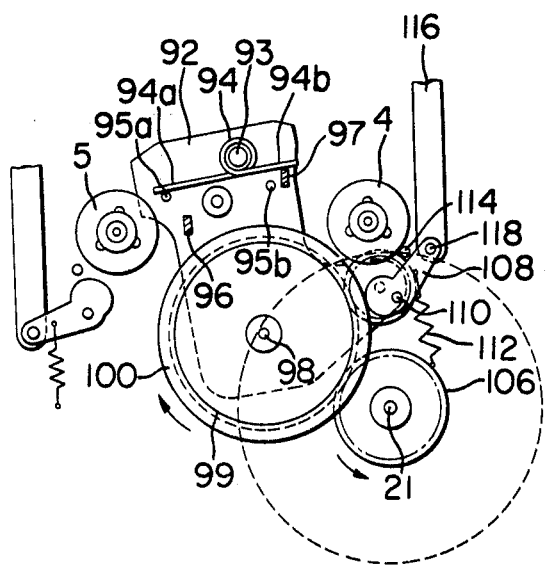

When the user depresses the fast-forward button 19, the projection 97 of the fast-forward rod 9 engages with the right arm of the spring 94 and moves it away from the pin 95b as shown in FIG. 16. As a result, the switching plate 92 is caused to rotate about the shaft 91 in the counterclockwise direction so that the pulley 100 on the switching plate 92 is pressed against the reel turntable and spindle 4 and the gear 99 constructed integral with the pulley 100 is brought into mesh with the capstan gear 106. As a result, the rotation in the counterclockwise direction of the capstan 21 is transmitted to the reel turntable 4 through the capstan gear 106, the gear 99 in mesh therewith and the pulley 100. Consequently, the turntable 4 is rotated in the counerclockwise direction to take-up the tape at an accelerated speed. When the connecting rod 116 is displaced in the direction A in the fast-forward mode, the eccentric arm 108 is rotated in the counterclockwise direction against the spring 112 as shown in FIG. 17 and engages with the pulley 100. As the pulley 100 rotates in the clockwise direction, the eccentric arm 108 firmly grips the pulley and moves it away from the reel turntable 4. Since the rotation of the capstan 21 is no longer transmitted to the turntable 4, the latter is stopped and the tape transport is suspended so that the automatic lock release mechanism described above is activated.

As described above, in the rewind or fast-forward mode the connecting rod 115 or 116 is displaced in the direction A so that the tape transport is stopped and the automatic lock release mechanism is activated to release the rewind or fast-forward button 18 or 19. This is also true for the locked cue or review operation.

Figure 18:
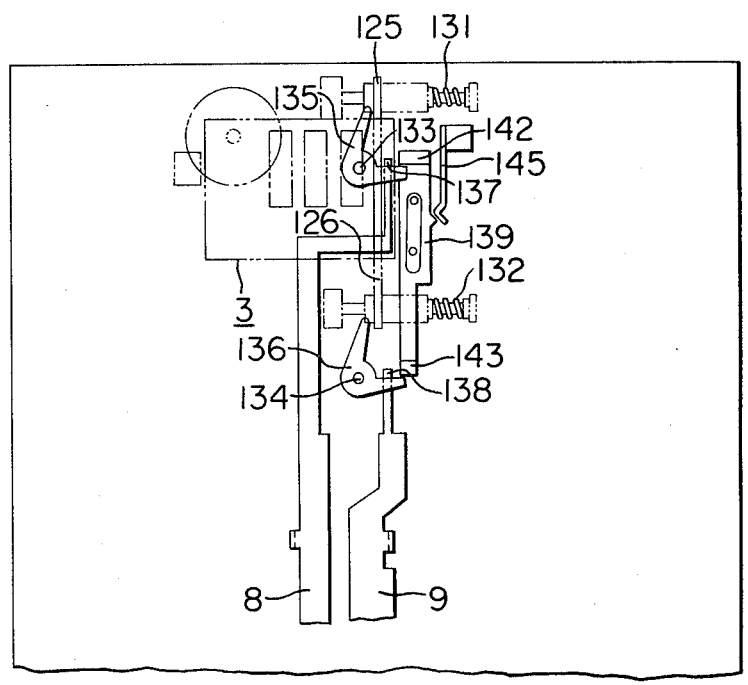
FIG. 18 is a top view of a counter mechanism.
Figure 19:
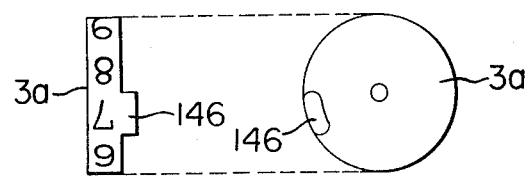
FIG. 19 is a front view and a side view of a decimal counter wheel 3a of the counter mechanism.
Figure 20:
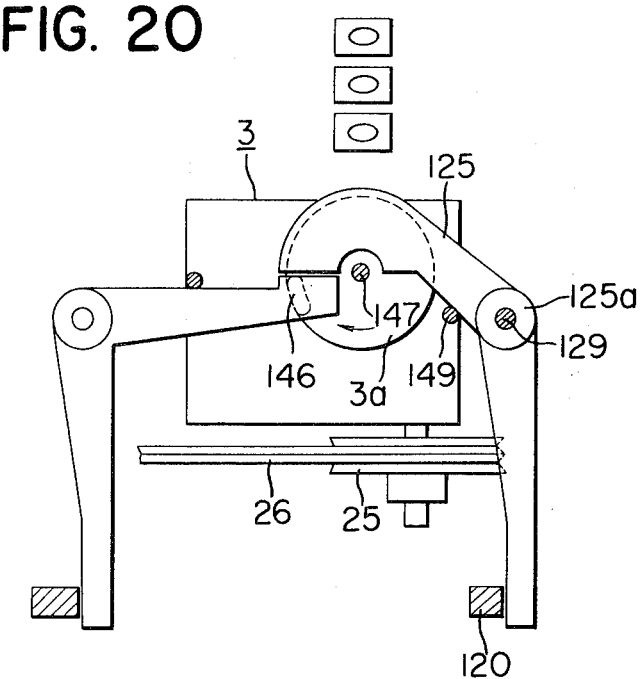
FIGS. 20–23 are side views of the counter mechanism used for the explanation of the mode of operation thereof.
Figure 21:
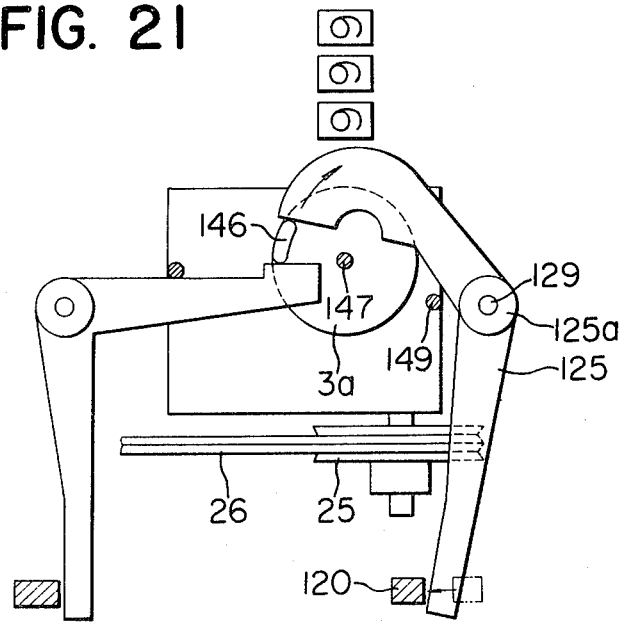
Figure 22:
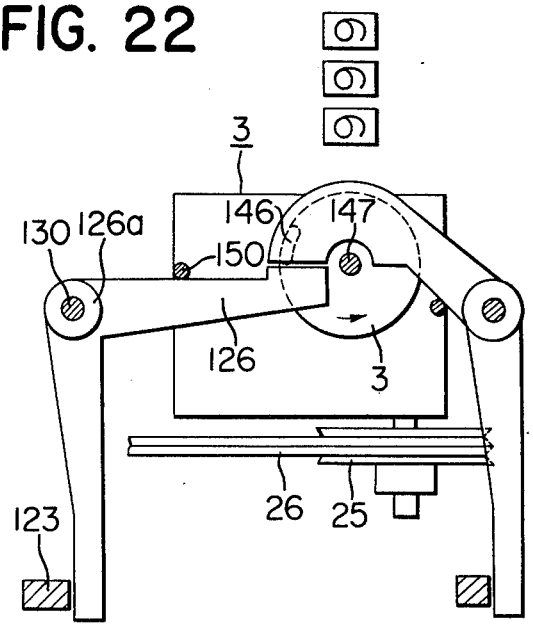
Figure 23:
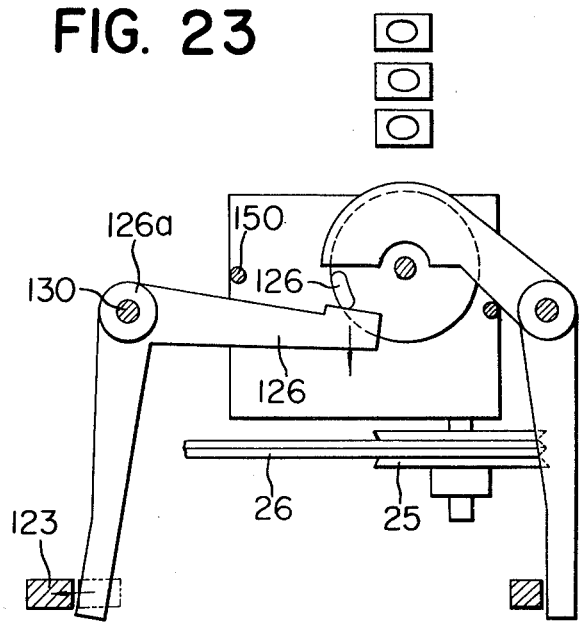
Figure 24:
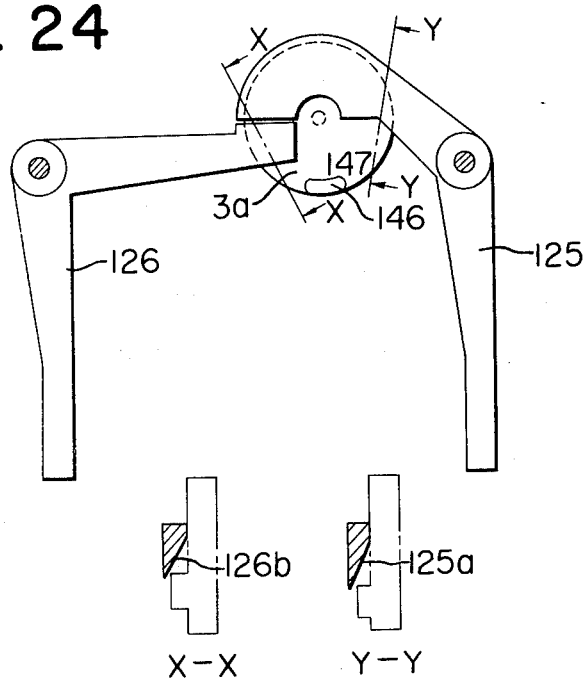
FIG. 24 shows actuating arms of the counter mechanisms.

The connecting rod 115 or 116 is automatically displaced in the direction A when the tape counter 3 displays a preset or predetermined numerical indication as will be described hereinafter. The counter mechanism will be described with reference to FIG. 2. The other end of the connecting rod 115 is pivoted with pin 119 to one end of an arm 120 which in turn is pivoted with a pin 121 to the main chassis 1. In like manner, the other end of the connecting rod 116 is pivoted with a pin 122 to one end of an arm 123 which in turn is pivoted with a pin 124 to the main chassis 1. Actuating arms 125 and 126 are disposed adjacent to the free ends of the arms 120 and 123 for engagement therewith. When the tape counter 3 displays a predetermined number in the rewind or fast-forward mode, the actuating arm 125 or 126 actuates or rotates the arm 120 or 123, thereby causing the connecting rod 115 or 116 to move in the direction A. Rotary shafts 125a and 126a of the actuating arms 125 and 126 are slidably fitted over long shafts 129 and 130, respectively, carried by members 127 and 128 which in turn are mounted on the main chassis 1 (See FIGS. 20 and 22). The long shafts 129 and 130 are disposed in parallel not only with each other but also with the main chassis 1. Coiled springs 131 and 132 are loaded on the long shafts 129 and 130, respectively, so that the rotary shafts 125a and 126a of the actuating arms 125 and 126 are normally biased in the direction C. Therefore, unless the actuating arms 125 and 126 are not exterted with external forces, they are pressed against the side face of a decimal counter wheel 3a in the tape counter 3 under such pressures that the rotation of the decimal counter wheel 3a may not be adversely affected. However, except when the rewind or fast-forward mode or when the memory mechanism is not activated, the actuating arms 125 and 126 are moved away from the decimal counter wheel 3a. That is, one arm of L-shaped stopper arms 135 and 136 which are pivoted with pins 133 and 134 to the main chassis 1 are engageable with the actuating arms 125 and 126 while the other arms are engageable with bent ends 137 and 138 of the rewind and fast-forward rods 8 and 9. This is best shown in FIG. 18. When the rewind and fast-forward rods 8 and 9 remain in the inoperative positions shown in FIG. 2 under the forces of the springs 13 and 14, the bent ends 137 and 138 of the rods 8 and 9 are brought into engagement with the other arms of the stopper arms 135 and 136 to prevent the rotation in the counterclockwise direction of the arms 135 and 136. Consequently the actuating arms 125 and 126 are kept away from the decimal counter wheel 3a in the tape counter 3. The sliding motion of the actuating arm may be also prevented by a memory set plate 139 which is slidable in both the directions A and B and is guided by guide pins 140 and 141 extended from the main chassis 1. Both ends of the memory set plate 139 are bent as shown at 142 and 143, and a triangular projection 144 is extended from the right side at the midpoint between the bent ends 142 and 143. A free end 145a of a leaf spring 145 which is fixed to the main chassis 1 is pressed against the inclined ridge or side of the projection 144. Therefore, the final position of the start-set plate 139 may be selectively determined when the plate 139 is displaced in the direction A or B. That is, when the start-set plate 139 is displaced in the direction B by means of an operating knob which is externally operable, the bent ends 142 and 143 prevent the rotation in the counterclockwise direction of the stopper arms 135 and 136. Consequently, the actuating arms 125 and 126 remain away from the decimal counter wheel 3a. Under these conditions, regardless of the operations of the rewind and fast-forward buttons 18 and 19, the actuating arms 125 and 126 will not be released from their locked positions. This is the OFF state of the memory mechanism. On the other hand, when the start-set plate 139 is displaced in the direction A, upon depression of the rewind or fast-forward button 18 or 19, the stopper arms 135 and 136 are completely released from the actuating arms 125 and 126 so the latter are pressed lightly against the decimal counter wheel 3a. Thus, the memory mechanism is in the ON state. Further, the actuating arm 125 or 126 is rotated when a predetermined number is displayed in the ON state wherein the actuating arms 125 or 126 is pressed against the decimal counter wheel 3a will be described. As shown in FIG. 19, a projection 146 is extended from one side face of the wheel 3a and engages with the actuating arm 125 or 126 so as to rotate it. In addition to the decimal counter wheel 3a, the tape counter 3 has decimal counter wheels 3b and 3c, and the three wheels 3a, 3b and 3c are rotatably carried on a shaft 147. The left wheel 3c displays units; the intermediate wheel 3b, tens; and the right wheel 3a, hundreds. In this embodiment, when the rewind button 18 is depressed, the actuating arm 125 is rotated when the tape counter 3 displays "9 9 9" so that the connecting rod 115 is displaced in the direction A. When the fast-forward button 19 is depressed and locked, the actuating arm 126 is rotated when the tape counter 3 displays "0 0 0" so that the connecting rod 116 is displaced in the direction A. In the reproduce mode, the user sometimes resets the tape counter 3 by depressing a reset button 148 to index the tape. Thereafter, the user rewinds the tape and stops it immediately before or after the tape counter 3 displays "0 0 0" so that the user may listen to a desired song or the like. In this case, the user depresses the rewind button 18 to set the recording-reproducing device into the rewind mode or the locked review operation. Then, the actuating arm 125 is released and is pressed against the decimal counter wheel 3a. When the numeral displayed on the tape counter 3 is reversed to "0 0 0," the projection 146 of the wheel 3a engages with the actuating arm 125 as shown in FIG. 20. As the counter wheel 3a further rotates in the clockwise direction, the projection 146 pushes the actuating arm 125 upward so that the connecting rod 115 is displaced in the direction A through the arm 120. Consequently, the tape transport is suspended and the rewind button 18 is released from the locked position in the manner described above. In the rewind mode, the recording-reproducing device is switched to the stop mode immediately before the tape counter 3 displays "0 0 0"; that is, when it displays "9 9 9." However, in the locked review mode, the device is changed over to the reproduce mode when the tape counter 3 displays "999." The above operations may be effected as when the user depresses the rewind button, the user also sets the memory set plate 139 into the ON state. If the user forgets to set the memory set plate 139, the above operations may not be effected even when the tape counter displays "9 9 9" so that the tape rewinding continues. In this case, when the user sets the memory set plate 139 into the ON state and then depresses the fast-forward button 19 to change the direction of tape transport, the tape transport is suspended when the tape counter 3 displays "0 0 0" or the recording-reproducing device is switched into the reproduce state. More particularly, when the user depresses the fast-forward button 19, the actuating arm 126 is pressed against the counter wheel 3a. When the tape counter 3 displays "9 9 9," the projection 146 of the counter wheel 3a engages with the end face of the actuating arm 126 as shown in FIG. 22. As the counter wheel 3a is rotated further in the counterclockwise direction, the projection 146 pushes the actuating arm 126 downward so that the arm 126 is caused to rotate about the long shaft 130 in the clockwise direction. The connecting rod 116 is then displaced in the direction A through the arm 123 in the manner described above and consequently, the tape transport is suspended and the fast-forward button 18 is released from the locked position. Thus, in the fast-forward mode, the recording-reproducing device is switched to the stop mode when the counter 3 displays "0 0 0." However, in the locked cue mode, the device is changed over to the reproduce mode when the tape counter 3 displays "0 0 0." As shown in FIG. 24, the ends of the actuating arms 125 and 126 which engage with the projection 146 of the counter wheel 3a are inclined as shown at 125a and 126a. Thus, when the user depresses the reset button 148 of the counter 3 in the rewind or fast-forward mode with the memory mechanism ON, the projection 146 of the counter wheel 3a may not engage with the actuating arm 125 or 126. This permits the free reset of the tape counter 3. In FIGS.

20–23, reference numerals 149 and 150 denote stopper pins for limiting the rotation of the actuating arms 125 and 126 in the counterclockwise direction.

The operations of the memory mechanism may be summarized as follows:

(1) The recording-reproducing device may be automatically stopped in the rewind mode when the tape counter 3 displays "9 9 9."

(2) The recording-reproducing device may be automatically set to the reproduce mode in the locked review mode when the tape counter 3 displays "9 9 9."

(3) The recording-reproducing device may be automatically stopped in the fast-forward mode when the tape counter 3 displays "0 0 0."

(4) The recording-reproducing device may be automatically switched into the reproduce state in the locked cue mode when the tape counter 3 displays "0 0 0."

Figure 25:
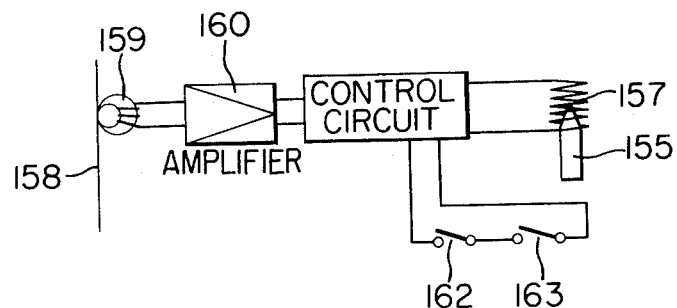
FIG. 25 is a circuit diagram of an automatic tape indexing mechanism.

With the above memory mechanism, when the tape counter 3 displays a predetermined number, the connecting rod 115 or 116 is displaced in the direction A so as to release the rewind or fast-forward button. Furthermore, according to the present invention, the automatic lock release mechanism which is activated in response to the stopping of the reel turntable 5 or 6 may be further utilized as, for instance, to stop the recording-reproducing device at a non-recorded portion between the adjacent music numbers recorded on the tape and to switch the rewind or fast-forward mode to the reproduce mode. A mechanism which may effect such operations as described above, will be referred to as "an automatic indexing mechanism" in this specification. This will be described in detail hereinafter with reference to FIG. 2. The connecting rods 115 and 116 which stop the rotation of the reel turntables in the rewind and fast-forward modes in the manner described above, are formed with laterally extended projections 151 and 152, respectively, and pins 153 and 154 are extended adjacent thereto for engagement therewith from a horizontal leg of a T-shaped lever 155. One end of the vertical arm of the T-shaped lever 155 is slidably inserted into a solenoid 157 mounted on the main chassis 1 while an elongated slot formed adjacent to the other or lower end is slidably fitted over a guide pin 156 extended from the main chassis 1. Thus, the T-shaped lever 155 is slidable in both the directions A and B. When the solenoid 157 is energized so that the lever 155 is displaced upward in the direction A against a tension spring 155', the pins 153 and 154 on the horizontal leg of the T-shaped lever 155 cause the connecting rods 115 and 116 to move upward or in the direction A. In FIG. 25, there is shown a diagram of a drive circuit of the solenoid 157. The output from the magnetic head 159 which reproduces the signals on the tape, is transmitted through an amplifier 160 to a control circuit 161 which detects an un-recorded or no signal portion on the tape 158. When the control circuit 161 detects the unrecorded or no-signal portion on the tape 158, it causes the solenoid 157 to be energized so as to attract the T-shaped lever 155. The control circuit 161 is further connected to a series circuit consisting of two switches 162 and 163 so that when and only when both the switches 162 and 163 are closed, the control circuit 161 may be enabled. The switch 162 is a normally open switch which may be closed only when the rewind or fast-forward button 18 or 19 is depressed, and the switch 162 has contacts 162a and 162b as shown in FIG. 2. When the user depresses the rewind or fast-forward button 18 or 19, the rod 8 or 9 causes the contact 162b to make an electrical contact with the contact 162a. The switch 163 is a manual switch which is operable from the exterior and which is closed in case of the automatic indexing mode. Therefore, when the automatic indexing switch 163 is closed in the locked cue or review mode, the solenoid 157 is energized to attract the T-shaped lever 155 in the direction A when the unrecorded or no-signal portion on the tape starts to pass across the head 159. As a result, the reel turntable 4 is stopped so that the automatic lock release mechanism is activated to release the fast-forward button 19 or the rewind button 18. Therefore, the recording-reproducing device may automatically start the reproduction from the head of the next recorded section on the tape 158. When the magnetic head 159 or an additional head is so arranged as to make contact with the tape even in the rewind or fast-forward mode, the recording-reproducing device may be automatically stopped upon detection of an unrecorded or no-signal portion on the tape.

Figure 26:
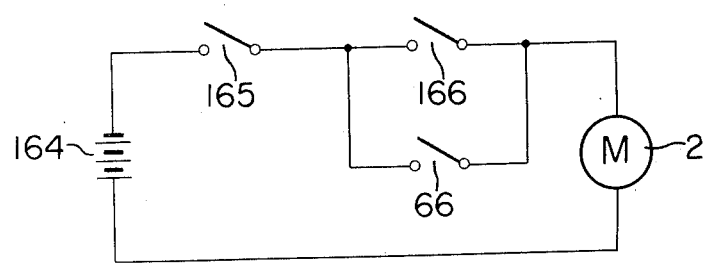
FIG. 26 is a diagram of a tape-transport motor drive circuit.

As described elsewhere, the operation button mechanism incorporated in the magnetic recording-reproducing device, in accordance with the present invention, releases the locked operation rod and then causes it to quickly return to its initial position under the force of the spring. Therefore, when this rod is returned to its initial position, great impact noise is generated, adversely affecting the recording or reproduce operations. For instance, when someone in the audience is recording music played by an orchestra in a concert hall, the above impact noise will adversely affect the recording quality. Furthermore, when impact noise is generated when one is recording a bird's singing, the bird will fly away. One solution to this problem is to turn off the power supply only when the tape has been completely taken up or rewound while keeping the record and reproduce buttons locked. To this end, the magnetic recording-reproducing device, in accordance with the present invention, includes a control mechanism which controls the operations of the automatic lock release mechanism. In FIG. 26, there is shown a diagram of this control mechanism. The tape transport motor 2, a power supply 164 and two switches 165 and 166 are connected in series to establish a motor drive circuit. Connected in parallel with the switch 166, is the normally closed switch 66 which is opened by the locking plate 59 in the manner described in conjunction with the operation button mechanism. The switch 165 is an ON-OFF switch which is closed when one of the operations buttons is depressed, and the switch 166 is manually operable from the exterior and is normally kept closed. However, it is opened when the tape transport motor 2 is stopped while keeping the record button or the record and reproduce buttons locked. When the reproduce and record buttons 17 and 16 are simultaneously depressed when the switch 166 is kept opened to set the recording-reproducing device into the record mode, the power ON-OFF switch 165 is closed. Consequently, the motor drive circuit consisting of the power supply 164, the motor 2, the switch 66 and the power ON-OFF switch 165 is established and the motor 2 is driven to transport the tape. When the tape is completely taken up, the take-up reel turntable 4 is stopped in the manner described above so that the locking plate 59 is displaced by the stroke L'. However, one or the first rotation of the arm 72 will not permit the record and reproduce buttons to be released. Thus, since the locking plate 59 has been displaced by the stroke L' and then is held in this position, the switch 66 is kept opened as best shown in FIG. 9. As a consequence, the motor drive circuit is short-circuited so that the motor 2 is de-energized while the record and reproduce buttons are kept locked. When the switch 166 is closed, the motor 2 is kept energized so that the second rotation of the arm 72 permits the release of the record and reproduce buttons 16 and 17 from the locked positions to the initial positions.

Figure 27:
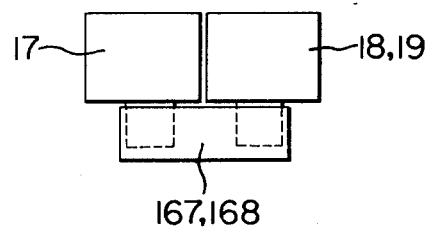
FIGS. 27 and 28 show modifications of the operations buttons.
Figure 27:
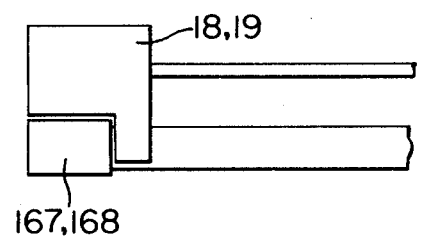
Figure 28:
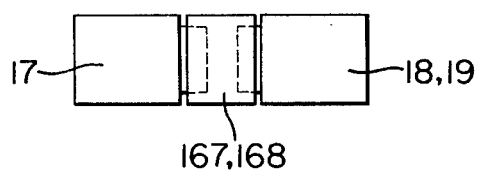
Figure 28:
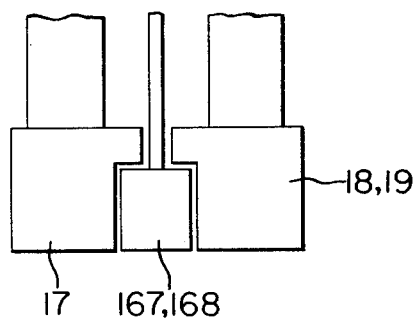

In order to facilitate the operations of the reproduce button 17 and the rewind or fast-forward button 18 or 19, they may be constructed and arranged as shown in FIGS. 27 and 28. That is, a review or cue button 167 or 168 is interposed between the reproduce button 17 and the rewind or fast-forward button 18 or 19 so that when the user depresses the review or cue button 167 or 168, both the reproduce button 17 and the rewind or fast-forward button 18 or 19 may be also depressed. Thus, there may be avoided an erratic operation as well as an erratic locking due to the failure of synchronization in the depression of operation buttons.

As described above, with the magnetic recording-reproducing device, in accordance with the present invention, the reproduce means and the rewind means or the fast-forward means may be simultaneously locked. Consequently, even when the review or cue operation is continued for a long time, the user is not required to keep the rewind or fast-forward means depressed so that the cue or review operation is facilitated. Furthermore, when the tape transport is suspended in the cue or review mode, the rewind or fast-forward means may be automatically released from the locked position and the magnetic recording-reproducing device may be automatically switched into the reproduce mode. When the further tape transport is permitted that is, when the tape is completely rewound in the review mode, the recording-reproducing device remains in the reproduce mode. However, when the further tape transport is not permitted that is, when the tape is completely taken up in the cue mode, the reproduce means may be automatically released from the locked position and the recording-reproducing device may be automatically stopped. Thus, the recording-reproducing device may be selectively and automatically switched to the reproduce mode or the stop mode depending upon the tape transport condition after the rewind means or the fast-forward means has been released from the locked position so that the manual operation may be conveniently eliminated.

With the magnetic recording-reproducing device in accordance with the present invention, when the tape counter displays a predetermined number in the rewind or fast-forward mode wherein the rewind means or the fast-forward means is locked and the tape is transported at an accelerated speed, one of the counter wheels in the tape counter causes the reel turntable stopping mechanism to stop the rotation of the reel turntable. Consequently, the automatic lock release mechanism is activated to release the rewind means or the fast-forward means from the locked position. Opposed to the above mechanical arrangement of the present invention, a prior art electrically-operated counterpart is such that when contacts on a counter wheel are closed, a plunger is energized so as to release the locked operation button. As a result, erratic operations and malfunctions frequently occur. But the automatic indexing mechanism in accordance with the present invention, may substantially eliminate these erratic operations and malfunctions and ensure the reliable and stable operations of the magnetic recording-reproducing device. Furthermore, the use of expensive parts such as a plunger may be eliminated so that the magnetic recording-reproducing device may be fabricated at less cost. Moreover, power consumption is considerably lowered advantageously.

With the magnetic recording-reproducing device in accordance with the present invention, when the manual switch is kept opened when the tape transport is suspended with at least one of the reproduce and record means kept locked, the tape transport motor is disabled while said at least one means remains locked. On the other hand, when said manual switch is kept closed, said at least one means is released from the locked position to the initial position. Thus, when the manual switch is kept opened in case of recording, for instance, live music in a concert hall or the like, the record means and the reproduce means will not be permitted to be released from the locked positions to the initial positions even when the tape is completely taken up. As a consequence, loud impact noise due to the return of the operation means to the initial position from the locked position, may be eliminated so that adverse effects on recording by other magnetic recording-reproducing devices may be eliminated and the audience will not be bothered. If desired, the manual switch may be kept closed so that when the tape is completely taken up, the operation means may be automatically released from the locked positions to the initial positions.

What is claimed is:

1. A magnetic recording-reproducing device comprising:
tape transport means including a reel turntable,
reproduce control means,
rewind control means,
fast forward control means,
means responsive to activation of each of said control means for operating said tape transport to provide the corresponding tape transport mode,
locking means for locking said reproduce, rewind and fast-forward control means in their operative positions,
automatic lock release means having first and second successive stages of operation and responsive to stopping of the tape transport for releasing said locking means thereby releasing said reproduce, rewind, and fast-forward means from their locked operative positions to their unactivated positions, the first stage of operation of said automatic lock release means releasing said rewind means or said fast-forward means from the locked operative position when said reproduce means and said rewind means or said fast-forward means are simultaneously locked, and the second stage of operation of said automatic lock release means releasing said reproduce means from the locked operative position thereof,
said lock release means comprising a rotor rotatable independently of said reel turntable, activating means including a lever and pawl and coupled to said reel turntable and said rotor for detecting when said reel turntable stops rotating and thereupon engaging said pawl with said lever to cause movement of said lever, and means for transmitting said lever movement to said locking means, so that said locking means is released when said reel turntable stops, said transmitting means effecting said first stage of operation in response to a first angular rotation of said rotor and subsequently effecting said second stage of operation in response to a second angular rotation of said rotor, said second stage of operation being effected only when said reel turntable remains stopped after said first stage of operation has been completed.

2. A magnetic recording-reproducing device comprising:

tape transport means,
reproduce control means,
rewind control means,
fast-forward control means,
means responsive to activation of each of said control means operating said tape transport to provide the corresponding tape transport mode,
locking means for locking said reproduce, rewind and fast-forward control means in their operative positions,
automatic lock release means having first and second successive stages of operation and responsive to stopping of the tape transport for releasing said locking means thereby releasing said reproduce, rewind, and fast-forward means from their locked operative positions to their unactivated positions, the first stage of operation of said automatic lock release means releasing said rewind means or said fast-forward means from the locked operative position when said reproduce means and said rewind means or said fast-forward means are simultaneously locked, and the second stage of operation of said automatic lock release means releasing said reproduce means, from the locked operative position thereof,
said tape transport including a reel turntable-and-spindle drive means coupled to said rewind or fast-forward control means for selectively causing said reel turntable-and-spindle to rotate at an accelerated speed,
said lock release means comprising a rotor rotatable independently of said reel turntable, activating means including a lever and pawl and coupled to said reel turntable and said rotor for detecting when said reel turntable stops rotating and thereupon engaging said pawl with said lever to cause movement of said lever, and means for transmitting said lever movement to said locking means, so that said locking means is released when said reel turntable stops, said transmitting means effecting said first stage of operation in response to a first angular rotation of said rotor and subsequently effecting said second stage of operation in response to a second angular rotation of said rotor, said second stage of operation being effected only when said reel turntable remains stopped after said first stage of operation has been completed,
a tape counter means coupled to said tape transport means, including a plurality of counter wheels rotatable in unison with said tape transport means, and
a reel turntable-and-spindle stopping means for stopping the rotation of said reel turntable-and-spindle when said counter wheels reach predetermined angular positions, said reel turntable-and-spindle stopping means stopping the rotation of said reel turntable-and-spindle when said counter wheels reach said predetermined angular position when said rewind means or said fast-forward means is locked, so that said automatic lock release means is activated, thereby releasing said locked rewind or fast-forward means.

3. A magnetic recording-reproducing device comprising:

tape transport means including a reel turntable,
reproducing control means,
rewind control means,
fast-forward control means,
means responsive to activation of each of said control means for operating said tape transport to provide the corresponding tape transport mode,
locking means for locking said reproduce, rewind and fast-forward control means in their operative positions,
automatic lock release means having first and second successive stages of operation and responsive to stopping of the tape transport for releasing said locking means thereby releasing said reproduce, rewind, and fast-forward means from their locked operative positions to their unactivated positions, the first stage of operation of said automatic lock release means releasing said rewind means or said fast-forward means from the locked operative position when said reproduce means and said rewind means or said fast-forward means are simultaneously locked, and the second stage of operation of said automatic lock release means releasing said reproduce means from the locked operative position thereof,
said lock release means comprising a rotor rotatable independently of said reel turntable, activating means including a lever and a pawl and coupled to said reel turntable and said rotor for detecting when said reel turntable stops rotating and thereupon engaging said pawl with said lever to cause movement of said lever, and means for transmitting said lever movement to said locking means, is released when said reel turntable stops, said transmitting means effecting said first stage of operation in response to a first angular rotation of said rotor and subsequently effecting said second stage of operation in response to a second angular rotation of said rotor, said second stage of operation being effected only when said reel turntable remains stopped after said first stage of operation has been completed,
said tape transport means including a tape-transport motor, a power supply, and a normally closed switch, and
a manually-operable switch connected in parallel with said normally closed switch, and
means for opening said normally closed switch in response to the first stage of operation of said automatic lock release, means to stop said tape-transport motor, whereby when said manually operable switch is open the tape transport motor is de-energized with the reproduce control means locked and when said manually operable switch is closed the tape transport motor remains energized so that the second stage of operation releases the reproduce control means.

* * * * *